United States Patent
Gerbier et al.

[15] 3,655,446
[45] Apr. 11, 1972

[54] METHOD OF PREPARATION OF CUPRIC SULFIDE ELECTRODES

[72] Inventors: Gerard Marcel Gerbier, Biard; Victor Louis Dechenaux, Poitiers, both of France

[73] Assignee: Societe Des Accumulateurs Fixes et de Traction (Societe Anonyme), Romainville, France

[22] Filed: July 8, 1970

[21] Appl. No.: 53,311

[30] Foreign Application Priority Data

July 11, 1969 France..................................6923837

[52] U.S. Cl..............................................136/23, 136/117
[51] Int. Cl. ........................................................H01m 35/02
[58] Field of Search...................................136/23, 115–117, 136/137, 6, 100; 23/135, 138, 206

[56] References Cited

UNITED STATES PATENTS

| | | | |
|---|---|---|---|
| 3,279,952 | 10/1966 | Minnick | 136/100 |
| 3,450,570 | 6/1969 | Root | 136/120 |
| 3,132,054 | 5/1964 | Carson, Jr. | 136/137 |
| 1,198,066 | 9/1916 | Schoenmehl | 136/116 |

FOREIGN PATENTS OR APPLICATIONS

| | | | |
|---|---|---|---|
| 1,490,725 | 6/1967 | France | 136/23 |

*Primary Examiner*—Anthony Skapars
*Attorney*—Kenyon & Kenyon Reilly Carr & Chapin

[57] ABSTRACT

An improved method of preparing cupric sulfide electrodes for electrochemical cells wherein the electrodes are made by preparing a first mixture comprising the total stoichiometric amount of copper required and about 25 to 35 percent by weight of the required stoichiometric amount of sulfur and heating this first mixture in a pre-sulfuration step to a temperature of between 120° and 160° C., then preparing a second mixture by adding to the product of the presulfuration step the complemental balance of the stoichiometric amount of required sulfur relative to the whole amount of copper or a slightly larger amount, compressing the second mixture in a mold under a pressure of from 0.25 to 2 t/cm$^2$ and heating the second mixture in a sulfuration step for about 15 hours to a temperature between 120° and 160° C., thereafter demolding and cooling the mold contents and then heating the cooled content now in form of an electrode again to a temperature of from 120° to 160° C. for about 10–15 hours to provide the cupric sulfide electrode.

The process avoids limitations of amounts of cupric sulfide that may be formed while avoiding ignition of the sulfur during sulfuration of the copper which ignition danger currently limits production to 20 gram batches.

Electrodes and electrochemical cells with such electrodes are also described.

21 Claims, No Drawings

METHOD OF PREPARATION OF CUPRIC SULFIDE ELECTRODES

BRIEF SUMMARY OF INVENTION

The invention relates to the preparation of cupric sulfide electrodes, to the electrodes and to electrochemical cells using them. Such electrodes may be used as positive electrodes in numerous electrochemical cells and more particularly as cathodes in cells with lithium anodes and non-aqueous electrolytes.

The French Pat. No. 1,490,725, filed June 23, 1966 and entitled "Method for preparing a cupric sulfide electrode and electrode thus obtained" has already disclosed a method consisting as a first step in making a substantially stoichiometric mixture of copper power and sulfur, then in shaping this mixture under compression in a mold, in heating the compressed mixture in the mold at a temperature within the 120° to 160° C. range and then after unmolding and cooling in further heating the cooled product thus obtained at a temperature within the 120° to 160° C. range. The compression in the mold is effected under pressures within the 0.25 to 2 t/cm² range and preferably at about 0.5 t/cm², the heating in the mold being carried out for about 15 hours and the heating of the demolded product for about 10 to 15 hours.

However, it has been found that the practice of the hereinabove described method had the following drawback: it was not possible to manufacture considerable amounts of cupric sulfide, from the sulfur-copper mixtures, in substantially stoichiometric proportions, because this risked ignition of the sulfur during the sulfuration of copper whenever the mass of the mixture exceeded about 20 gram. In other words, a material limitation in the amount of mixture that can be treated at one time exists in the procedure of said French patent with consequent slowness of production.

Objects and features of this invention are to remedy this drawback and eliminate the limitation as to size of batches capable of being processed at one time, thus speeding up production.

The present invention provides a method for preparing a cupric sulfide electrode in which substantially stoichiometric amounts of copper and sulfur are used and which eliminates limitations as to size of batches capable of being processed at a time. The process comprises, a sulfuration stage more especially including compressing the heated resultant products of a pre-sulfuration stage in a mold and heating the product at a temperature within the 120° to 160° C. range, and a final processing stage or step at a temperature within the 120° to 160° C. range outside of the mold, wherein previous to the said sulfuration stage or step a pre-sulfuration stage or step is carried out, consisting in heating at a temperature within the 120° to 160° C. range a first mixture formed by the whole stoichiometric amount of required copper and about 25 to 35 percent of the stoichiometric amount of required sulfur, then in adding to the thus processed mixture of the pre-sulfuration stage the complement of the required stoichiometric amount of sulfur or a slightly larger amount to provide a second mixture, carrying out the sulfuration stage of the second mixture and subsequently after removal from the mold effecting a further heating of the electrode resulting from the sulfuration stage.

Advantageously, after the pre-sulfuration stage a material capable of increasing the electric conductivity of the desired electrode is added to the mixture of the presulfuration stage at the same time as the complement of sulfur in making the second mixture for the following reason. During the discharge of a cell provided with a cupric sulfide cathode, the electrochemical reduction of cupric sulfide is effected in two distinct steps: first the cupric sulfide is reduced to cuprous sulfide according to the reaction $$2 CuS + 2e^- \rightarrow Cu_2S + S^{2-}$$

then the cuprous sulfide is reduced to copper according to the reaction:

$$Cu_2S + 2e^- \rightarrow 2 Cu + S^{2-}$$

Both cupric sulfide and copper are electrically conductive but cuprous sulfide is not.

Due to this fact, at the end of the first reduction step, the electrode mixture is not sufficiently conductive. This would cause an increase of the internal resistance of a cell provided with such an electrode, this resistance increasing e.g. from 1 to 3 ohms. This is why it is advantageous to provide in the desired electrode a material capable of increasing its electrical conductivity.

This material may be constituted by acetylene black the the content of which may be about 2 percent be weight of the total amounts of sulfur and copper.

This 2 percent content of acetylene black is sufficient to decrease by half the aforesaid variation of internal resistance; a larger amount does not bring any substantial improvement at the usual discharge rates. Nickel flakes also may be added together with the acetylene black, the nickel flake content being about 2 to 5 percent by weight of the total stoichiometric amounts of sulfur and copper. Cells built with resulting electrodes display improved performance at high rates; thus the energy density of a cell the cathodes of which comprises acetylene black 2 percent and nickel flakes 2.5 percent reaches 205 Wh/kg whereas the energy density of a cell of the same type without these improvements is 185 Wh/kg for a 40 hour discharge.

Also, nickel powder can be used instead of acetylene black. However, for obtaining a similar result, the amount of nickel powder added in making the second mixture must be about 10 percent by weight of the total stoichiometric amount of sulfur and copper, so that the weight of the resultant electrode is increased and this may be a drawback in some cases.

In order to make the electrode according to the invention it is advantageous to use a copper powder made of dendritic particles the size of which are less than 50 microns and the apparent density of which is within the 1 to 2 range. Such particle shape promotes the sulfuration and the sintering of sulfide particles during heating, thus ensuring the mechanical strength of the desired electrode. A powder with scale shaped particles may also be used, the grain size being between 1 and 40 microns and the apparent density being about 1.

Advantageously, in order to complete the sulfuration of copper, the total amount of sulfur used in making the second mixture is greater by about 5 percent than its required total stoichiometric amount of sulfur.

It has been found that when a stoichiometric mixture of copper and sulfur is used, the sulfuration reaction of copper is never complete, even when the sulfurated electrode is submitted to a further heating. The presence of non-sulfurated copper may have the drawback of transforming cupric sulfide into cuprous sulfide during use, thus decreasing the capacity of the electrode. The aforesaid use of an excess of sulfur suppresses this drawback. In all event, the excess of sulfur is eliminated during the final heating stage.

DETAILED DESCRIPTION

Examples of carrying out the process of this invention to produce the cupric sulfide electrodes and electrochemical cells with such electrodes follow:

Example I

A first batch of copper powder of the type described and powdered sulfur in which a stoichiometric full amount of copper and from 25 to 35 percent by weight of the required stoichiometric amount of sulfur are mixed together to form a first mixture. The copper powder therein is preferably in the form of dendritic particles whose size is less than 50 microns with an apparent density within the 1 to 2 range. This particle shape promotes sulfuration and sintering of sulfide particles during heating, thus ensuring the mechanical strength of the electrode to be formed. In the alternative, the copper powder may be in the form of scale shaped particles whose grain size ranges from between 1 to 40 microns and with an apparent density of about 1.

This first mixture of the full stoichiometric amount of such copper powder together with 25 to 35 percent by weight of the required stoichiometric amount of sulfur is subjected to a presulfuration stage or step by heating the mixture to a temperature of from 120° to 160°C. for about 2 to 5 hours.

The product of this pre-sulfuration stage is then mixed with a complemental amount of the total stoichiometric amount of sulfur increased up to 5 percent by weight of the total required stoichiometric amount of sulfur and this second mixture is deposited in a mold and compressed therein under a pressure ranging from 0.25 to 2 t/cm$^2$ and preferably at a pressure of 0.5 t/cm2. The compressed second mixture in the mold is then heated in a sulfuration step to a temperature ranging from 120° to 160°C. for about 15 hours. Thereafter, the product of this second sulfuration step in the form of a molded electrode is removed from the mold and cooled. This electrode after cooling is heated again outside of the mold for about 10 to 15 hours at a temperature ranging again from 120° to 160°C. During such final heating, the excess sulfur eliminates itself. Cooling prior to the final heating may be omitted if desired.

The resulting finished electrode is cupric sulfide.

There is no limitation in this procedure as to the size of the batch treated as all possibilities of ignition of the sulfur likely to occur if the original copper-sulfur mixture were to contain the full stoichiometric amounts both of copper and sulfur in a mass exceeding a weight of about 20 grams, are prevented by the invention.

Example II

The same presulfuration stage of the same first mixture as in Example I is carried out for the same length of time at the the same temperature. The resultant product of this presulfuration stage is then mixed with additional sulfur in the same amounts as in Example I to provide the second mixture to which is added a conductivity increasing material such as acetylene black in the amount of about 2 percent by weight of the total stoichiometric amounts of sulfur and copper, or else a mixture of this latter amount of acetylene black with nickel flakes the latter in the amount of from about 2 to 5 percent by weight of the stoichiometric amounts of sulfur and copper, or else, nickel powder instead of acetylene black may be added to the second mixture in the amount of about 10 percent by weight of the total stoichiometric amount of copper and sulfur.

The second mixture containing at least one of said conductively increasing materials is then placed in a mold and compressed therein under a pressure ranging from 0.25 to 2 t/cm$^2$. This compressed mixture in the mold is then heated in a sulfuration step to a temperature ranging from 120° to 160°C. for about 15 hours. Thereafter, the product of this sulfuration step in the form of a molded electrode is removed from the mold and cooled, if desired.

The electrode after removal from the mold is again heated outside the mold for about 10 to 15 hours at a temperature again from 120° to 160°C. During such final heating excess sulfur is eliminated.

The resulting finished electrode as in Example I is cupric sulfide whose conductivity is increased by the added conductivity increasing material.

Again, there is no limitation as to size of batch treated for the same reasons as in Examples I.

EXAMPLE III

The same pre-sulfuration stages of the first mixtures of Examples I and II are effected. THe second mixtures of either of these examples are again deposited in a mold and during such deposit into the mold a metal carrier sheet is positioned preferably in a median plane in the second mixture in the mold. This metal carrier may be a nickel plated perforated steel sheet about 0.10 mm. thick provided, for example, with circular perforations or holes about 2 mm in diameter whose defining edges preferably protrude on both faced of the sheet, the total vacant space to total surface area of the sheet being in the range of 30 to 40 percent. This sheet may be electrochemically copper plated, the thickness of the plating on each side of the sheet being about 0.03 mm. Such copper film or plating does not become wholly sulfurated during the subsequent heating steps and promotes adherence of the copper sulfide to the sheet.

The carrier-incorporated second mixture is then compressed in the mold to under a pressure ranging from 0.25 to 2 t/cm$^2$ and then heated at a temperature ranging from 120° to 160° C. for about 15 hours. Thereafter, the product in the form of a metal carrier-containing electrode is removed from the mold and cooled, if desired.

This electrode after removal from the mold is again heated at a temperature ranging from 120° to 160° C. for about 10 to 15 hours during which excess sulfur is eliminated.

The resultant finished metal carrier-containing electrode consists of the metal carrier bearing adhered cupric sulfide.

Advantageously, in order to promote adherence of copper sulfide to the metal carrier the edges defining the perforations or holes protrude on both faces of the carrier sheet.

The mechanical strength of this electrode is reinforced by the metal carrier which also increases its electrical conductivity.

EXAMPLE IV

The procedure of Example III is followed except that instead of the perforated metal carrier of Example III, a sheet of expanded nickel or nickel plated steel is substituted whose vacant space to total surface area ratio is within the same 35 to 40 percent range. This sheet, likewise, may have copper plating on its surfaces of the same thickness as that on the perforated sheet.

The final electrode product of this example is an expanded metal carrier bearing adhered cupric sulfide. The mechanical strength of this electrode is reinforced by the carrier which also increases the conductivity of said electrode.

EXAMPLE V

The same pre-sulfuration stages of the first mixtures of examples I and II are effected. The same second mixture of either of these examples is heated to a temperature of from 120° to 160° C. for about 15 hours. Thereafter this second mixture is cooled and an organic binder such as polyvinylalcohol or preferably polytetrafluoroethylene is added to it, in an amount equal to from 20 to 30 percent of the weight of the said mixture. It is then compressed in a mold with or without the carrier of any of examples III and IV, removed from the mold and heated to a temperature of from 120° to 160° C for about 15 hours.

The electrodes of any of the examples may have suitable dimensions, for example, being 50 × 50 × 1.2 mm. in size. Other suitable dimensions may be selected as required.

EXAMPLE VI

An electrochemical cell is constructed with a unit comprising at least one cupric sulfide electrode of any of Examples I to V together with a lithium sheet electrode positioned at at least one face of such cupric sulfide electrode with an insulating separator interposed between the respective electrodes, the separator being, for example polypropylene felt. This electrode-separator unit is positioned in a casing and a non-aqueous electrolyte comprising, for example, tetrahydrofuran organic solvent and lithium perchlorate solute is added to the casing. The electrochemical cell thus constructed is a lithium-cupric sulfide electrochemical cell with non-aqueous electrolyte. Other electrolytes also may be used. The lithium electrodes likewise may be replaced by other suitable electrodes.

While specific embodiments of the invention have been disclosed, variations in procedure within the scope of the appended claims are possible and are contemplated.

There is no intention of limitation to the exact abstract or disclosure herein presented.

What is claimed is:

1. A process for preparing a cupric sulfide electrode consisting of the steps of preparing a first mixture of the full stoichiometric amount of required copper powder and about 25 to 35 percent by weight of the total stoichiometric amount of sulfur, then in a pre-sulfuration step heating this first mixture to a temperature ranging from 120° to 160° C. for about 2 to 5 hours, mixing the product of this presulfuration step with an amount of sulfur substantially equal to the complemental amount required of the total stoichiometric amount of sulfur to provide a second mixture, then in a second sulfuration step compressing the said second mixture in a mold and heating the second mixture to a temperature ranging from 120° to 160° C. for about 15 hours, then removing the second mixture from the mold in form of an electrode and finally reheating the electrode after removal from the mold for about 10–15 hours at a temperature ranging from 120° to 160° C. yielding a cupric sulfide electrode.

2. A process according to claim 1 including addition to the second mixture prior to the second sulfuration step of a conductivity increasing material in an amount which is a small percentage by weight of the total stoichiometric amounts of copper and sulfur.

3. A process according to claim 2 wherein said material is acetylene black in the proportion of about 2 percent by weight of the total stoichiometric amounts of sulfur and copper.

4. A process according to claim 3 wherein said material also includes nickel flakes in the amount of about 2 to 5 percent by weight of the total stoichiometric amounts of sulfur and copper.

5. A process according to claim 2 wherein said material is nickel powder in the amount of about 10 percent by weight of the total stoichiometric amounts of copper and sulfur.

6. A method according to claim 1 wherein subsequent to removal from the mold of the electrode it is cooled prior to the final reheating thereof.

7. A method according to claim 1 wherein the first heating of the second mixture of the sulfuration step is effected prior to compression of the second mixture in the mold and after the said first heating an organic binder is added thereto.

8. A method according to claim 7 wherein the said organic binder is chosen from the group of polyvinyl alcohol and polytetrafluoroethylene.

9. A method according to claim 1 wherein the copper powder comprises dendritic particles less than 50 microns in size with an apparent density of from 1 to 2.

10. A method according to claim 1 wherein the copper powder comprises scale shaped particles whose size ranges from 1 to 40 microns with an apparent density of about 1.

11. A method according to claim 1 wherein the complement amount of sulfur utilized in the second mixture exceeds by about 5 percent by weight the total required stoichiometric amount of sulfur.

12. A method according to claim 1 including positioning a metal carrier in the second mixture during insertion of said mixture into said mold.

13. A method according to claim 12 wherein said metal carrier is positioned in a median plane of the second mixture in the mold.

14. A method according to claim 12 wherein said metal carrier comprises a perforated metal sheet.

15. A method according to claim 14 wherein said perforated metal sheet is nickel plated.

16. A method according to claim 12 wherein said metal carrier is an expanded metal sheet.

17. A method according to claim 16 wherein said expanded metal sheet is nickel plated.

18. A method according to claim 16 wherein said expanded metal sheet is of nickel.

19. A method according to claim 12 wherein said metal carrier is copper plated to a thickness of about 0.03 mm on each face thereof.

20. A method according to claim 14 wherein edges defining the perforations in said perforated sheet protrude from both faces of said sheet.

21. A method according to claim 1 wherein compression of the second mixture in the mold is at a pressure of from 0.25 to 2 t/cm$^2$.

* * * * *